(12) United States Patent
Watanabe

(10) Patent No.: US 7,184,885 B2
(45) Date of Patent: Feb. 27, 2007

(54) NAVIGATION SYSTEM AND METHOD THEREFOR

(75) Inventor: Takayuki Watanabe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 383 days.

(21) Appl. No.: 10/829,670

(22) Filed: Apr. 22, 2004

(65) Prior Publication Data

US 2004/0267443 A1  Dec. 30, 2004

(30) Foreign Application Priority Data

May 2, 2003  (JP) .............................. 2003-127379

(51) Int. Cl.
 *G01C 21/26* (2006.01)
(52) U.S. Cl. .................. 701/201; 701/208; 340/995.23
(58) Field of Classification Search ........ 701/200–202, 701/207, 211, 213, 23, 25; 700/17, 83–84, 700/86–87; 340/988, 995.1, 995.23; 725/13, 725/19–20, 37
See application file for complete search history.

(56) References Cited

U.S. PATENT DOCUMENTS

| 5,260,944 | A | * | 11/1993 | Tomabechi ................. 370/347 |
| 5,396,496 | A | * | 3/1995 | Ito et al. ..................... 370/314 |
| 6,038,508 | A | | 3/2000 | Maekawa et al. |
| 6,615,134 | B2 | * | 9/2003 | Ando ......................... 701/209 |

\* cited by examiner

*Primary Examiner*—Y. Beaulieu
(74) *Attorney, Agent, or Firm*—Brinks Hofer Gilson & Lione

(57) ABSTRACT

A navigation system includes an image search unit for searching across an image database by using image data transmitted from an image data input unit, as a search key, a search-result output unit for displaying at least one piece of image data extracted by the search on a display, and a destination determination unit for reading point information corresponding to image data selected by a user from the display and determining the read point information to be a destination. Where information about the location, name, telephone number, zip code, address, and so forth, of a point which the user wants to determine to be the destination is not provided, the point can be searched by using image data including an image of the building or scenery of the point.

20 Claims, 5 Drawing Sheets

NAVIGATION SYSTEM AND METHOD THEREFOR

BACKGROUND OF THE INVENTION

1. Field of the Invention

The present invention relates to a navigation system, and particularly relates to a navigation system having a route-guidance function for searching a most suitable guidance route from the current point to a destination and guiding a driver along the searched guidance route.

2. Description of the Related Art

In general, known navigation systems for vehicle travel guidance not only display a map of an area around the current position but also specify a destination, thereby automatically setting a guidance route from the current position to the destination for guiding the driver. According to this route-guidance function, a simulation according to the breadth first search (BFS) method or the Dijkstra method is performed, whereby a route with the smallest cost from the current position to the destination is automatically searched by using map data. This searched route is determined to be the guidance route.

After the guidance route is determined, the guidance route is displayed by a thick line having a predetermined color different from that of other routes, so as to distinguish the guidance route from the other routes on a map image while the vehicle is traveling. When a distance between the vehicle and a guidance intersection on the guidance route has a predetermined or smaller value, predetermined intersection guidance is provided for guiding the driver to the destination. This intersection guidance includes an intersection guidance image including an enlarged intersection image and an arrow image for indicating a direction along which the driver should travel, and travel direction guidance by voice, for example.

The destination can be determined by moving a cursor on the map image, or selecting a predetermined point from among a destination menu list. According to the former method, a user operates a remote control or the like, thereby scrolling the map image, putting the cursor on a predetermined point and setting the point, as the destination. According to the latter method, the user selects and inputs a keyword such as a facility name, a point name, a telephone number, an address, a zip code, and so forth, through a menu image, thereby searching a predetermined point. Then, the user determines the searched point to be the destination.

Where the former method is used, the user must correctly know the location of a point that is to be set as the destination. On the other hand, where the latter method is used, the user must know at least one of the facility name, phone number, address, zip code, and so forth, even though the user does not know the location of the point that is to be set as the destination.

However, the user often does not know the location or facility name of the point, even though he/she knows the building or scenery of the point that is to be set as the destination. In this case, it is not possible to search the point and determine the destination by using the point search function of the known navigation systems. Therefore, a new point search method is needed for allowing a destination to be determined in the above-described case.

In the past, technologies for extracting the feature amount of an object image from image data, identifying an object by searching information about the extracted feature amount, and displaying various information about the identified object, as a search result, have been known. An example of the above-described technologies is disclosed in Japanese Unexamined Patent Application Publication No. 2000-113097.

As has been described, the known navigation devices can perform point search by using information including the facility name, area name, telephone number, address, zip code, and so forth, of a point which is to be set as a destination, as a keyword. Therefore, where the above-described information is not provided, the known navigation systems cannot perform the point search, whereby the destination cannot be determined.

SUMMARY OF THE INVENTION

Accordingly, it is an object of the present invention to allow for determining a destination by performing a point search by using image data including the building image, scenery image, and so forth, of a point which is to be set as the destination, even though information including the location, facility name, and so forth, of the point is not provided.

For solving the above-described problems, a navigation system according to a first embodiment of the present invention searches across an image data base storing image data obtained by photographing two or more areas by using input image data, as a search key, and extracting at least one piece of image data bearing a predetermined level of resemblance to the search key. Then, the navigation system outputs and presents the image data extracted by the image search unit and point determination information that is stored and correlated with the extracted image data to a user. Upon receiving the image data and the point determination information, the user selects at least one piece of image data from among the presented image data, whereby the point determination information correlated with the selected image data can be determined to be a destination.

Therefore, where image data obtained by photographing a predetermined point is input and a search is performed, at least one image matching with the input image and point determination information correlated therewith are obtained and presented to the user. Where the user selects one of the at least one image, the point is determined to be the destination. Thus, where the information of a point which the user wants to determine to be the destination, the information including location, name, telephone number, address, zip code, and so forth, is not provided, it becomes possible to search and determine the point to be the destination by using the image data of the point. [Not Applicable]

DESCRIPTION OF THE PREFERRED EMBODIMENTS

Figure 1:
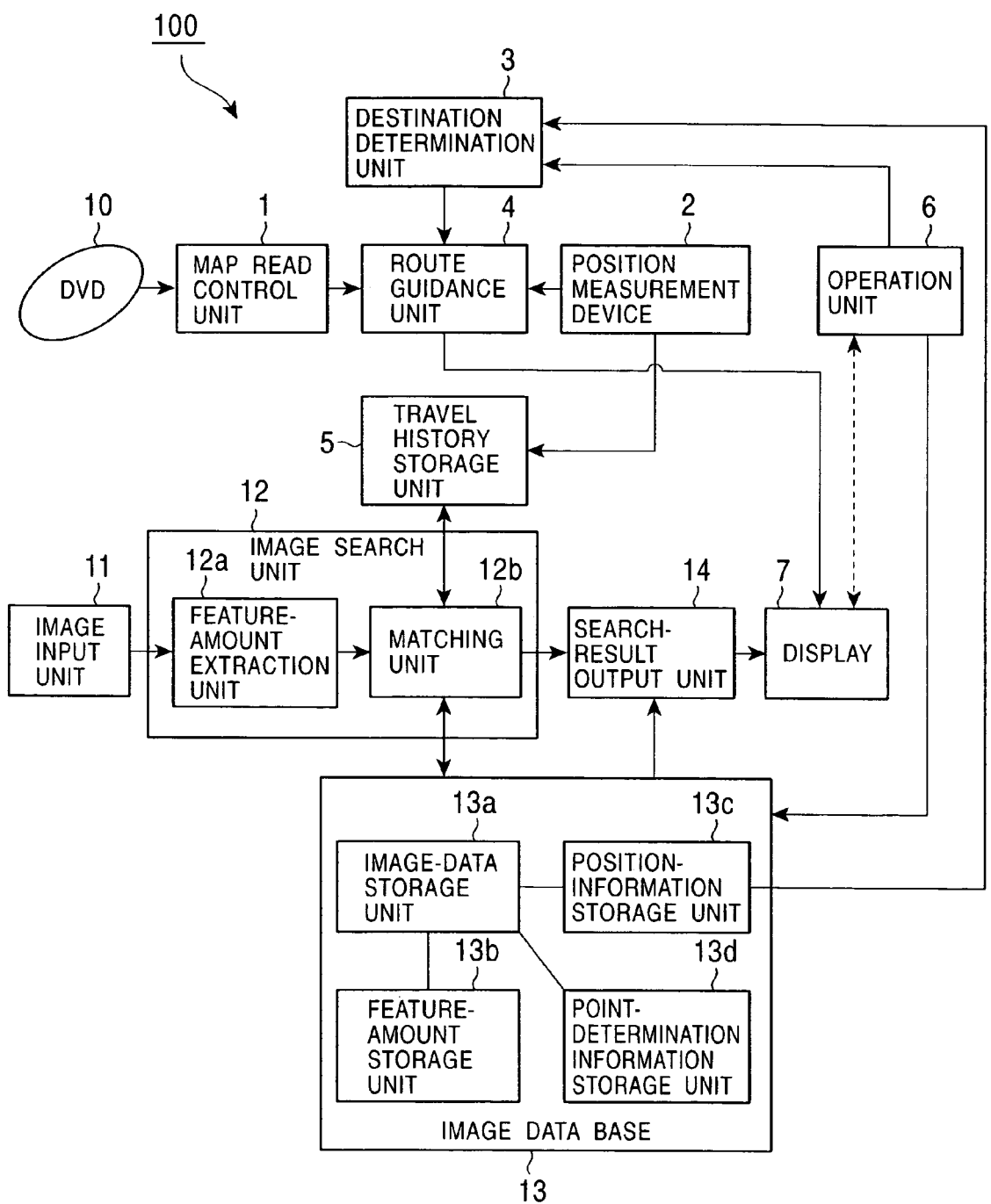
FIG. 1 is a functional block diagram illustrating the main part of a navigation system according to a first embodiment of the present invention.

A first embodiment of the present invention will now be described with reference to the attached drawings. FIG. 1 is a functional block diagram illustrating the configuration of the main part of a navigation system 100 of this embodiment.

As shown in this drawing, the navigation system 100 of this embodiment includes a map read control unit 1, a position measurement device 2, a destination determination unit 3, a route guidance unit 4, a travel-history storage unit 5, an operation unit 6 such as a remote control, a touch panel, and so forth, a display 7, an image input unit 11, an image search unit 12, an image data base (DB) 13, and a search-result output unit 14.

The map read control unit 1 controls an operation for reading map data transmitted from a map recording medium 10 formed as a digital versatile disk (DVD), a compact disk (CD), a hard disk, or other storage medium. The map recording medium 10 stores various map data required for performing map display, route search, and so forth.

The position measurement device 2 measures the current position of a vehicle and includes a self-contained navigation sensor, a GPS receiver, a position calculation CPU, and so forth. The self-contained navigation sensor includes a vehicle-speed sensor (a distance sensor) for detecting a moving distance of the vehicle by outputting one pulse for every predetermined travel distance. The self-contained navigation sensor further includes an angular-velocity sensor (a relative direction sensor) such as a vibration gyro or the like for detecting a turning angle (a moving direction) of the vehicle. The self-contained navigation sensor detects the relative position and direction of the vehicle by using the vehicle-speed sensor and angular-velocity sensor.

The position calculation CPU calculates an absolute vehicle position (an estimated vehicle position) and a vehicle direction, based on data on the relative position and direction of the vehicle from the self-contained navigation sensor. The GPS receiver receives radio waves transmitted from a plurality of GPS satellites through a GPS antenna and calculates the absolute position and direction of the vehicle by performing a three-dimensional positioning process, or a two-dimensional positioning process. The vehicle direction is calculated according to the current vehicle position and a vehicle position calculated one sampling time ΔT before.

The destination determination unit 3 is used for determining the destination of a guidance route. As in the past, this determination is achieved by scrolling a map image and setting the position of a cursor put on a predetermined point, as a destination. Further, a point searched by selecting and inputting a keyword from among facility names, point names, telephone numbers, addresses, zip codes, and so forth, that are displayed on a menu screen can be determined to be the destination. In this embodiment, it is also possible to set the destination according to an image search method described below.

The route guidance unit 4 performs a process for searching a guidance route with the smallest cost from the current point to a destination by using map data read from the map recording medium 10 by the map read control unit 1. The guidance route on a map image is indicated by a thick line with a predetermined color different from the colors of other lines so that a user can discriminate between the guidance route and the other routes while the vehicle travels. Further, when a distance between the vehicle and a guidance intersection has a predetermined or smaller value, intersection guidance is performed, so as to guide the user to the destination. This route guidance is performed by using data on the vehicle current position measured by the position measurement device 2.

The travel-history storage unit 5 stores the travel history information of the vehicle by using the current position measured by the position measurement device 2, the destination information set by the destination determination unit 3, and so forth. This travel history information includes travel position information indicating places traveled by the vehicle and the destination location, travel time information indicating travel time, where the travel time information is output from the GPS receiver, and so forth.

The operation unit 6 has various types of operators such as buttons, a joystick, and so forth, so that the user can set various types of information such as the destination of route guidance and perform various operations such as a menu-selection operation, a zoom in/out operation, a manual map scroll operation, a numerical-value input operation, and so forth.

The display 7 produces a map image, an intersection guidance image, a menu image used for determining a destination, an image of the result of image search that will be described later, and so forth. This display 7 may be formed as a touch panel of the operation unit 6.

The image DB 13 is a data base storing information relating to images obtained by photographing various places including tourist attractions, various facilities, and so forth. This image DB 13 includes an image-data storage unit 13a, a feature-amount storage unit 13b, a position-information storage unit 13c, and a point-determination information storage unit 13d, as shown in this drawing.

The image-data storage unit 13a stores image data on the above-described points. The feature-amount storage unit 13b stores a feature amount extracted from this image data. The position-information storage unit 13c stores position information indicating which part of the map data stored in the map recording medium 10 corresponds to the photographed point. The point-determination information storage unit 13d stores information for determining the photographed point. This information includes data on the tourist attractions and facility names, for example.

These feature amount, position information, and point determination information are associated with the image data corresponding thereto. Where this association is established, it is not necessary to store all the above-described items of information in the same data base.

This image DB 13 stores information about famous tourist attractions, facilities, and so forth, in advance. However, adding to the above-described information, the image DB 13 can store image data on a predetermined point photographed by the user by using a digital camera or the like, and a feature amount, position information, and point determination information relating to the image data.

It may be configured that the user can switch back and forth between an image search mode and an image registration mode by controlling the operation unit 6. Where the image registration mode is selected, image data transmitted from the image input unit 11 is stored in the image-data storage unit 13a, and the feature amount extracted from the feature-amount extraction unit 12a is stored in the feature amount storage unit 13b. The feature-amount extraction unit 12a will be described later.

The user inputs the position information and the point determination information to the position-information storage unit 13c and the point-determination information storage unit 13d, respectively, by controlling the operation unit 6. In this case, the user can input the position information by scrolling a map image on the display 7 and putting a cursor on a predetermined photographed point. Further, the user can also input keywords displayed on the menu screen, search a photographed point corresponding to the keywords, and issue an instruction for inputting the position information corresponding to the searched point to the position-information storage unit 13c, whereby the input position information is registered with the position information storage unit 13c.

The image input unit 11 stores image data functioning as a search key. More specifically, this image input unit 11 includes an insertion slot used for a removable recording medium such as a memory card, where this insertion slot is mounted on the main body of the navigation system 100. Therefore, image data that is obtained by photographing a predetermined point by using a digital camera or the like (not shown) and that is stored in the memory card can be transmitted to the navigation system 100 via a memory card inserted into the insertion slot.

The image search unit 12 searches through the image DB 13 by using the image data of the search key transmitted from the image input unit 11 and extracts at least one piece of image data bearing a predetermined or higher level of resemblance to the search key. This image search unit 12 includes a feature-amount extraction unit 12a and a matching unit 12b, as shown in this drawing.

The feature amount extraction unit 12a extracts a feature amount from the image data transmitted from the image input unit 11. The matching unit 12b verifies the extracted feature amount against the feature amount of accumulated image data stored in the feature amount storage unit 13b, and extracts at least one piece of image data bearing high resemblance to the accumulated image data. For example, the feature amount extraction unit 12a may extract image data bearing a predetermined or higher level of resemblance to the accumulated image data in decreasing order of resemblance.

In this case, the matching unit 12b can reduce the search range by using the travel history information stored in the travel history storage unit 5 according to an instruction transmitted from the user who controls the operation unit 6. That is to say, where the matching unit 12b receives an instruction from the user to perform image search for places where the user traveled in the past, the matching unit 12b verifies the information about places where the user traveled in the past stored in the travel history storage unit 5 against the information about photographed positions stored in the position-information storage unit 13c. Then, image search is performed only for image data obtained by photographing the positions where the user traveled in the past. This image data includes the image data that had been stored in the image DB 13 and image data added thereto by the user. Since the search range is reduced, the time required for searching images is also reduced.

In this embodiment, the search range is limited according to the information about positions where the user had traveled. However, the search range may be reduced according to other methods. For example, the user may select the image registration mode and additionally store photographed image data, the feature amount, position information, and point determination information relating thereto into the image DB 13. Further, the user may store information about the photographing date of the image data in the point-determination information storage unit 13d. In this case, the matching unit 12b verifies travel time information in the past stored in the travel-history storage unit 5 against the photographing-date information stored in the point-determination information storage unit 13d, and performs image search only for data on images photographed on the same date as the travel date, or a photographing date within a predetermined error range.

Since the search object includes not only data on images photographed on the same date as the travel date, but also data on images photographed on a date within a predetermined range having an error of several days, data on an image photographed by the user who stops his/her vehicle and strolls therearound during travel can be included in the search object. Subsequently, it becomes possible to reduce the search object range and image search time and increase the hit rate.

In this embodiment, the search object range is reduced in real time only for the image DB 13. However, another image database may be provided for storing data on the places where the vehicle traveled, for example. In this case, where the user transmits an instruction to perform image search for the places where the user traveled in the past, image search is performed for the image database storing the image data on the places where the user traveled. Where such an instruction is not transmitted from the user, image search is performed for the entire search range of the image DB 13.

The search-result output unit 14 outputs at least one piece of image data extracted by the image search unit 12 and point-determination information correlating therewith stored in the image DB 13 to the display 7, so that the image data and the point-determination information are displayed on a monitor screen of the display 7. The user controls the operation unit 6 and selects a predetermined piece of data from the at least one piece of image data displayed on the monitor screen.

Where the user controls the operation unit 6 and selects the predetermined piece of image data, the selected image data is transmitted to the destination determination unit 3. Then, the destination determination unit 3 reads position information correlating with the selected image data from the image DB 13, and determines it to be the destination.

The functions of the above-described navigation system 100 including a CPU, an MPU, a RAM, a ROM, and so forth, are achieved by running programs stored in the RAM and ROM.

Figure 2:
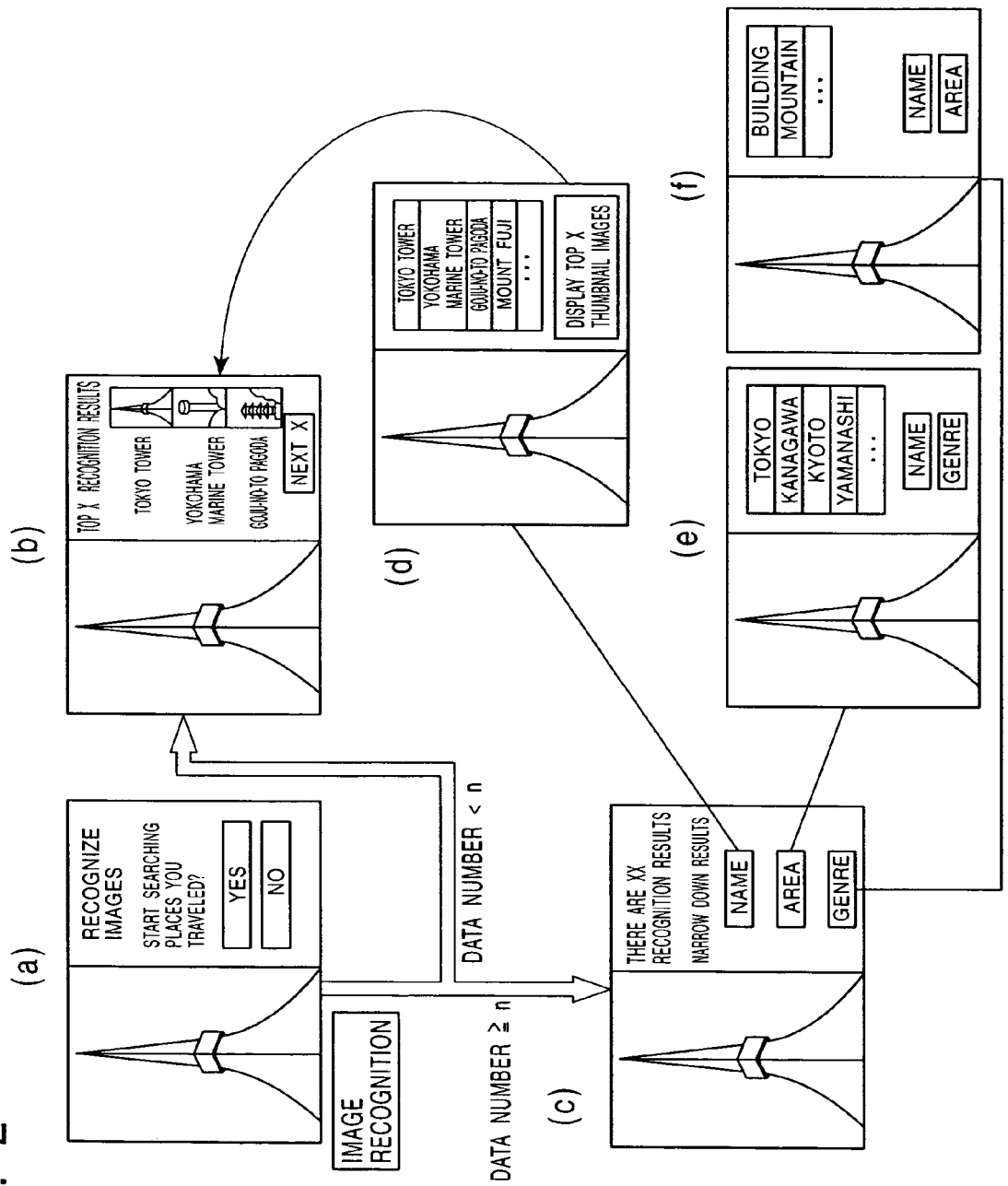
FIG. 2A shows a first image for illustrating image transition and example operations performed by the navigation system, where the operations are performed for image search and destination determination.
FIG. 2B shows a second image for illustrating the image transition and the example operations performed by the navigation system, where the operations are performed for the image search and destination determination.
FIG. 2C shows a third image for illustrating the image transition and the example operations performed by the navigation system, where the operations are performed for the image search and destination determination.
FIG. 2D shows a fourth image for illustrating the image transition and the example operations performed by the navigation system, where the operations are performed for the image search and destination determination.
FIG. 2E shows a fifth image for illustrating the image transition and the example operations performed by the navigation system, where the operations are performed for the image search and destination determination.
FIG. 2F shows a sixth image for illustrating the image transition and the example operations performed by the navigation system, where the operations are performed for the image search and destination determination.

Operations for image search and destination determination in the above-described navigation system 100 will now be described with reference to FIGS. 2A, 2B, 2C, 2D, 2E, and 2F. First, data on an image photographed by a digital camera or the like is input to the image input unit 11, as a search key. Subsequently, the image of the input image data and a menu of choices for determining whether or not search should be performed for the places where the user traveled in the past are produced on the monitor screen of the display 7, as shown in FIG. 2A.

Where the user selects one of the choices by controlling the operation unit 6, the image search unit 12 performs an image search. Where the user transmits an instruction for performing an image search for the places where the user traveled, the image search unit 12 performs image search across the image DB 13 only for a limited range based on the travel-history information stored in the travel history storage unit 5. If such information is not transmitted from the user, the image search unit 12 performs an image search for the entire range of the image DB 13.

The search-result output unit 14 displays the image search result obtained by the image search unit 12 to the monitor screen of the display 7. In this case, where the number of image data that has a predetermined or higher level of resemblance and that is obtained through the search is less than n (the value of n can be arbitrarily determined), x (x≦n and the value of x can be arbitrarily determined) thumbnail images of the image data and information about names or the like specifying the photographed points are displayed in decreasing order of the resemblance, as shown in FIG. 2B.

At this time, the search-result output unit 14 produces a choice image shown as "next x", as well as the thumbnail images on the monitor screen of the display 7. When the user selects this choice image by controlling the operation unit 6, the search result output unit 14 selects and displays an additional x names or the like, that is, x+1 to 2x names from among the search result in decreasing order of resemblance on the monitor screen of the display 7. At this time, thumbnail images corresponding to these x names are also displayed.

When the user selects one of the thumbnail images displayed, as shown in FIG. 2B, by controlling the operation unit 6, the position information corresponding to the selected thumbnail image is transmitted from the image DB 13 to the destination determination unit 3. The destination determination unit 3 determines the transmitted position information to be the destination of the guidance route.

Where the number of image data obtained by the image search is n or more, the search-result output unit 14 displays the number of searched image data and a plurality of narrowing-down conditions, as a menu list of choices including "name", "area", "genre", and so forth, on the monitor screen of the display 7, as shown in FIG. 2C. Subsequently, the user can select a predetermined narrowing-down condition by controlling the operation unit 6.

Where the user selects the narrowing-down condition indicating "name", the search-result output unit 14 selects and displays the names of points from the search result in decreasing order of resemblance on the monitor screen of the display 7, as shown in FIG. 2D. Further, the search-result output unit 14 displays a choice shown as "display top x thumbnail images". In this case, the user can select one from among the displayed names. Subsequently, the position information corresponding to the selected name is transmitted from the image DB 13 to the destination determination unit 3, and determined to be the destination of the guidance route.

Where the user selects the choice shown as "display top x thumbnail images", the search-result output unit 14 displays the thumbnail images and the point names corresponding to the top x search results in decreasing order of resemblance, as shown in FIG. 2B. As described above, where one of the thumbnail images is selected by the user, the position information corresponding to the selected thumbnail image is transmitted from the image DB 13 to the destination determination unit 3 and determined to be the destination of the guidance route.

Where the user selects the narrowing-down condition indicating "area", the search result output unit 14 displays names corresponding to the search results in decreasing order of the resemblance, as shown in FIG. 2E. The user can select one of the displayed names. Where the number of search results obtained for the selected area is less than n, the thumbnail images and names corresponding to the top x search results are displayed, as shown in FIG. 2B. However, where the number of search results is n or more, more detailed narrowing-down conditions are displayed (not shown).

FIG. 2E shows other narrowing-down conditions "name", "genre", and so forth, as a menu list of choices. The user can select one from among these narrowing-down conditions by controlling the operation unit 6. That is to say, the user can further narrow down the name or genre after he/she selects the area.

When the user selects the narrowing-down condition indicating "genre" on a screen shown in FIG. 2C, the search-result output unit 14 displays genre names corresponding to the search result in decreasing order of resemblance, as shown in FIG. 2F. The user can select any one from among the displayed genre names. Where the number of search results obtained for the selected genre name is less than n, the thumbnail images and names corresponding to the top x search results are displayed, as shown in FIG. 2B. However, where the number of search results is n or more, more detailed narrowing-down conditions are displayed.

FIG. 2F shows other narrowing-down conditions "name", "area", and so forth, as a menu list of choices displayed on the monitor screen. The user can select one of these narrowing-down conditions by controlling the operation unit 6. That is to say, the user can further narrow down the name or area after he/she selects the genre.

It may be arranged that information about a use frequency of the plurality of narrowing-down conditions displayed, as shown in FIGS. 2C to 2F, is controlled, so as to sort the display order of the narrowing-down conditions in decreasing order of the use frequency. For example, the narrowing-down conditions of the areas, such as Tokyo, Kanagawa, Kyoto, Yamanashi, and so forth, are displayed in that order on the monitor screen, as shown in FIG. 2E. Other area names that cannot be displayed on the same image can be displayed in sequence by scrolling or the like. Where the use frequency of the other areas that are outside the screen and displayed in the lower part of the narrowing-down condition list increases, the narrowing-down conditions of the other areas are put high on the narrowing-down condition list. Subsequently, it becomes possible to use narrowing-down conditions having high use frequency without scrolling, which is highly convenient for the user.

As has been described, according to this embodiment, the search through the image DB 13 is performed by using data on an image photographed by a digital camera or the like, as the search key. Then, the at least one piece of image data extracted through the search and the area name corresponding thereto are output and presented to the user. Subsequently, when the name and photographed place corresponding to the image data, the image data being used as the search key, are not provided, the user can determine the area name.

Further, according to this embodiment, it becomes possible to obtain the position information correlating with the image data selected by the user from among an image-data list displayed as the search result and determine the obtained position information to be the destination. Thus, where the information of a point which the user wants to determine to be the destination, the information including location, name, and so forth, is not provided, it becomes possible to search and determine the point to be the destination by using the image data of the point.

Figure 3:
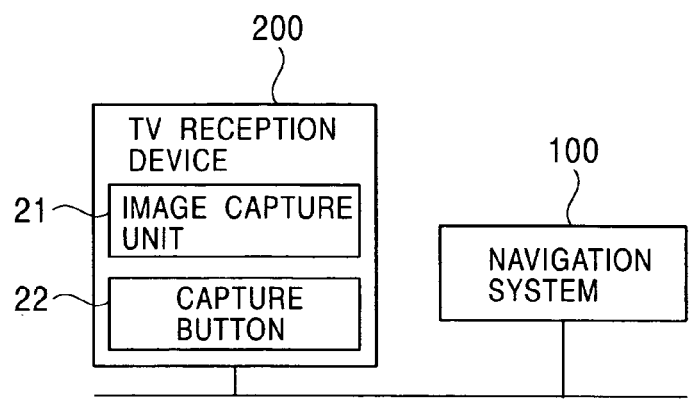
FIG. 3 is a block diagram illustrating an example functional configuration for achieving an example method for inputting image data used as a search key.

In the above-described embodiment, the image data obtained by the digital camera or the like is input to the navigation system 100 via a removable recording medium such as a memory card or the like. However, the image input method is not limited to the above-described embodiment. For example, the image data may be input to the navigation system 100 by drawing a predetermined picture on the monitor screen of the display 7 formed as a touch panel. Further, a TV reception device 200 electrically connected to the navigation system 100 may cut partial images at predetermined times during reception and transmit the cut image to the navigation system 100, as shown in FIG. 3.

In this case, the TV reception device 200 includes an image capture unit 21 and a capture button 22. The image capture unit 21 cuts and outputs one frame of images during reception at the time when the user presses down the capture button 22. The image input unit 11 of the navigation system 100 inputs the image data transmitted from the image capture unit 21.

The TV reception device 200 does not necessarily include the image capture unit 21 and the capture button 22 as standard. The image capture unit 21 and the capture button 22 may be provided in a function extension unit added to the TV reception device 200, or provided as a purpose-built capture device. Alternatively, the navigation system 100 may include the image capture unit 21 and the capture button 22. In this case, the navigation system 100 transmits a capture command to the TV reception device 200 so that an image is input from the TV reception device 200 to the navigation system 100.

According to the above-described embodiment, the navigation system 100 includes the image DB 13 and the image search is performed for the image DB 13 provided in the user's vehicle. However, the present invention is not limited to the above-described embodiment. For example, where the image search is performed for the image DB 13 in the user's vehicle, and no image having a predetermined or higher level of resemblance is obtained, the user may access data centers outside the vehicle wirelessly through the Internet or the mobile-phone network. Otherwise, the user may access other vehicles by vehicle-to-vehicle communications, so as to perform image search by using image databases outside his/her vehicle. Further, the image DB 13 may not be provided in the user's vehicle at all. In this case, the user performs the image search by using the image databases outside his/her vehicle.

Figure 4:
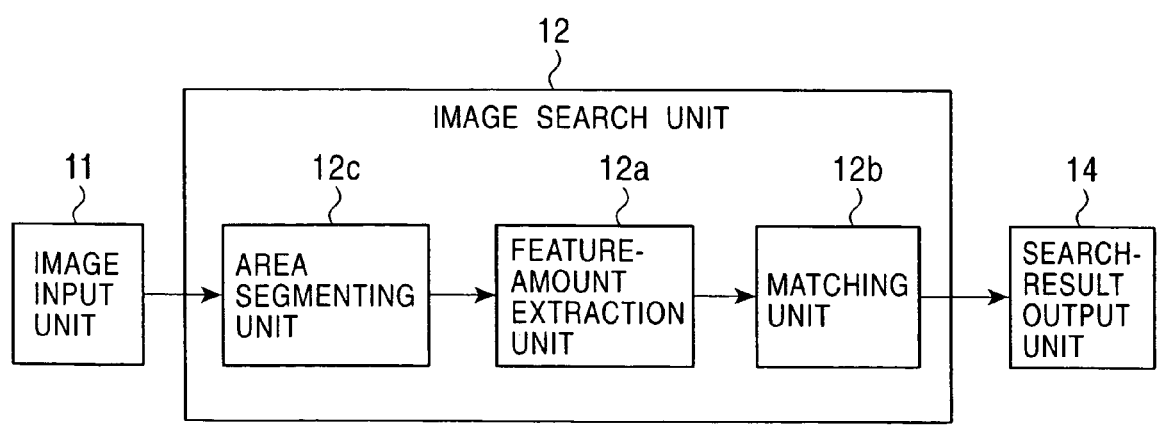
FIG. 4 is a block diagram illustrating an example functional configuration of an image search unit according to the first embodiment.

Further, according to the above-described embodiment, the image search is performed by using all pieces of image data transmitted from the image input unit 11 as search keys. However, part of the input image data may be segmented and used as the search key. In this case, the image search unit 12 further includes an area segmenting unit 12c before the feature-amount extraction unit 12a, as shown in FIG. 4.

The area segmenting unit 12c can use various types of area segmenting methods. That is to say, the present invention is not limited to the area segmenting method used in the above-described embodiment. For example, where the display 7 is formed as the touch panel, the user can specify a closed area by tracing the edge of a predetermined area, thereby segmenting and determining an image in the specified closed area to be the search key. Further, a plurality of areas may be segmented by extracting the edge of an object included in the image data transmitted from the image input unit 11, and the user may be made to select one of the segmented areas displayed on the screen. In this case, the image of a segmented area selected by the user is used as the search key.

Figure 5:
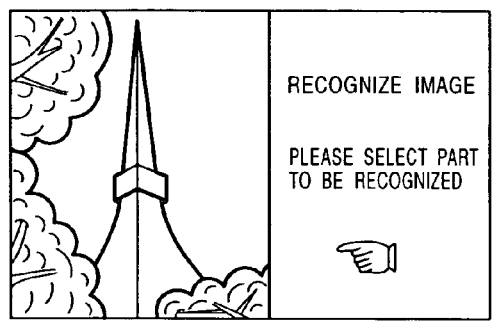
FIG. 5 illustrates an example area segmenting method.

As has been described, the search identification rate can be increased by segmenting a predetermined area and using the segmented area as the search key. That is to say, where a plurality of objects having a predetermined feature is shown in the input image data, an area different from an area the user wants to find may be erroneously searched. However, where an image including an area the user wants to find is selected and used as the search key, as shown in FIG. 5, an image similar to the image of an area other than the segmented area is prevented from being erroneously searched.

Figure 6:
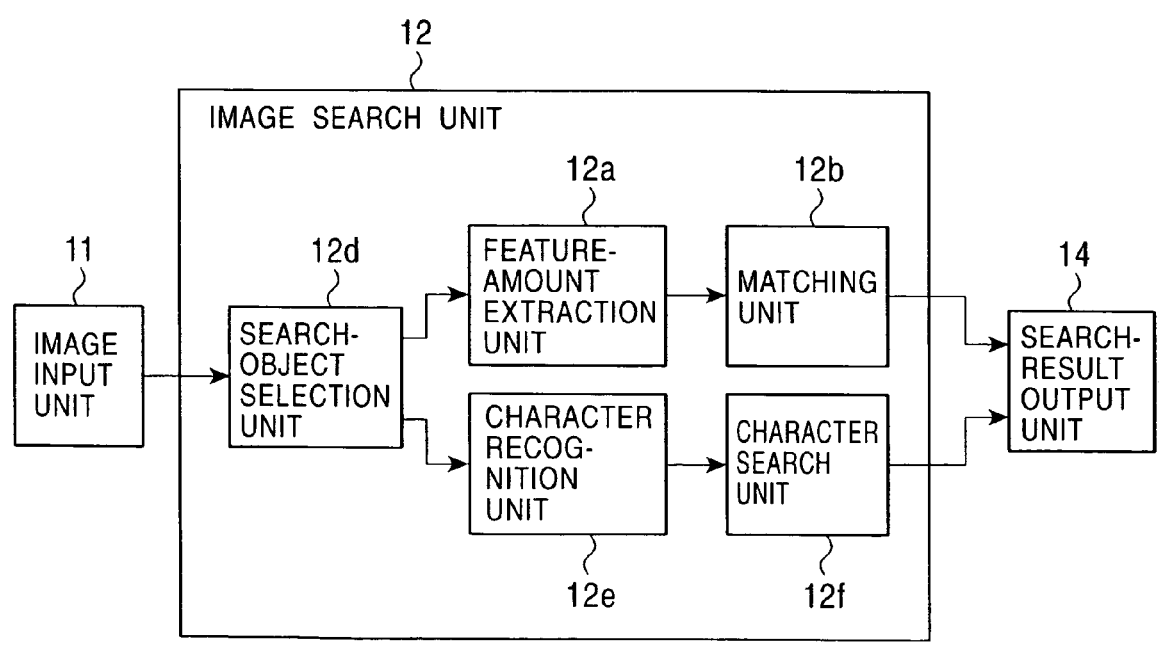
FIG. 6 is a block diagram illustrating another example functional configuration of the image search unit.

Further, the search keys used for the image search may be divided according to the types thereof. That is to say, the color, shape, pattern, and so forth, of the image data transmitted from the image input unit 11 may be used as the search keys. Otherwise, characters included in the image data transmitted from the image input unit 11 may be used as the search keys. In this case, the image search unit 12 may be configured, as shown in FIG. 6. In this drawing, the image search unit 12 includes a search-object selection unit 12d, a character recognition unit 12e, and a character search unit 12f, other than the above-described feature-amount extraction unit 12a and matching unit 12b.

Figure 7:
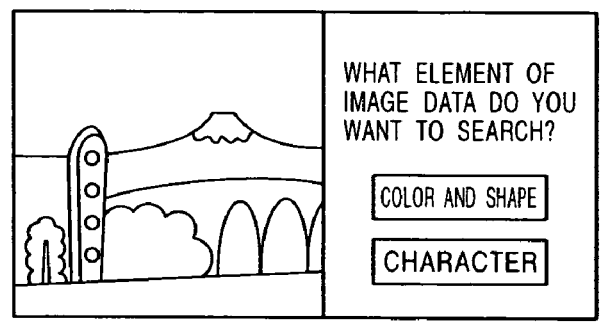
FIG. 7 illustrates an example image used for selecting a search object.

The search-object selection unit 12d displays a menu list of choices on the monitor screen of the display 7, as shown in FIG. 7, whereby the user is made to select the color, shape, pattern, and so forth, and the search key including the characters. When the user selects the search key including the color, shape, pattern, and so forth, by controlling the operation unit 6, the image search is performed, as described above, through the feature-amount extraction unit 12a and the matching unit 12b. When the user selects the search key including the characters, the image search is performed through the character recognition unit 12e and the character search unit 12f.

The character recognition unit 12e recognizes character information included in the transmitted image data. The character search unit 12f searches the names or the like of areas stored in the point-determination information storage unit 13d of the image DB 13, and extracts at least one name or the like bearing a predetermined or higher level of resemblance to the recognized character information. In this case, the search-result output unit 14 displays the extracted name or the like and an image corresponding thereto on the monitor screen of the display 7. Thus, character information can be searched through the character recognition. Accordingly, a photographed point can be searched with increased reliability.

Figure 8:
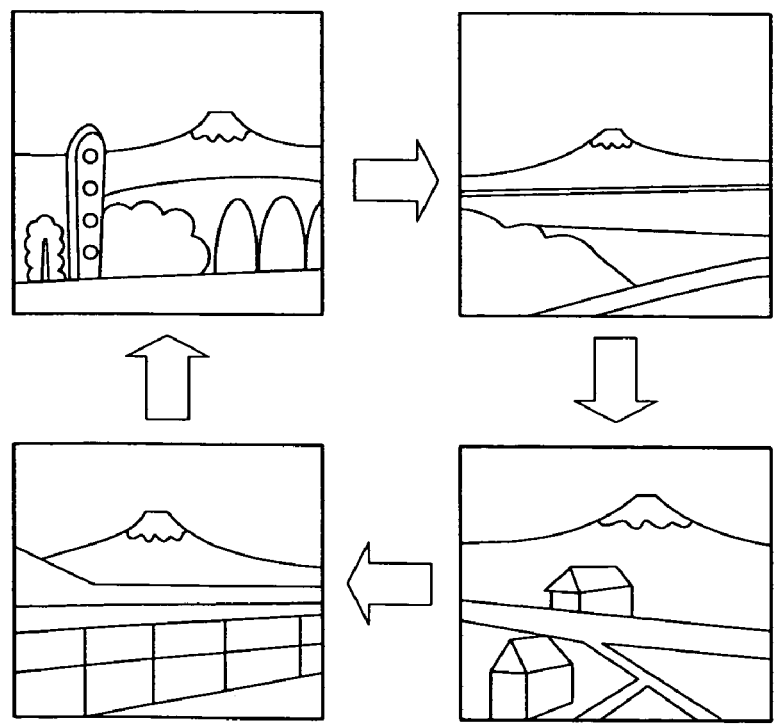
FIG. 8 illustrates an example output of the search result.

Further, where the result of searching tourist attractions, facilities, and so forth, is displayed, the result to be displayed may include image data obtained by photographing the tourist attractions, facilities, and so forth, from various angles, as shown in FIG. 8. In this case, it becomes necessary to register image data obtained by photographing the above-described places from various angles with the image DB 13. Subsequently, the user can select an area he/she wants to go and determine the area to be the destination by seeing images obtained by photographing the above-described places from various angles.

The above-described embodiments are examples for achieving the present invention. Therefore, it is to be understood that the scope of the present invention is not limited by the above-described embodiments. That is to say, the present invention can be achieved in various forms within the spirit and scope thereof and without losing the main features thereof.

What is claimed is:

1. A navigation system comprising:
    an image search unit for searching across an image database by using input image data, as a first search key, where the database stores image data obtained by imaging various areas and extracting at least one piece of image data bearing a predetermined or higher level of resemblance to the first search key;
    a search-result output unit for outputting the extracted image data; and
    a destination determination unit for determining position information stored and correlated with image data selected by a user from among the output image data to be a destination.

2. A navigation system according to claim 1, wherein the image search unit includes a feature-amount extraction unit for extracting a feature amount of the first search key and a matching unit for extracting at least one piece of image data whose feature amount bears a predetermined or higher level of resemblance to the extracted feature amount by comparing the extracted feature amount against a feature amount of each of the image data stored in the image database.

3. A navigation system according to claim 1, wherein the image search unit performs search only for image data correlating with position information specified by travel history information of a vehicle according to an instruction transmitted from the user.

4. A navigation system according to claim 1, wherein the image data stored in the image database is correlated with information indicating an imaging date of the image data, and wherein the image search unit performs search only for data on at least one image imaged on the same date as a travel date obtained from the travel history information of a vehicle, or a predetermined imaging date within a predetermined error range.

5. A navigation system according to claim 1, wherein the first search key is input via a removable recording medium to a main body of the navigation system.

6. A navigation system according to claim 1, wherein the first search key is obtained and input by segmenting a predetermined part of an image in predetermined timing, the image being received by a TV reception device provided in a vehicle.

7. A navigation system according to claim 1, further comprising an area segmenting unit for extracting an outline of an object included in the first search key and segmenting a predetermined area from the first search key, wherein the image search unit searches across the image database by using image data within the segmented area, as a second key.

8. A navigation system according to claim 1, further comprising:
    a search-object selection unit for permitting the user to determine whether or not the search is performed by using character information included in the first search key;
    a character recognition unit for recognizing character information included in the first search key, when the user determines to search by using the character information; and
    a character search unit for searching point-determination information that is stored and correlated with the image data stored in the image database by using the recognized character information, as a third search key, and extracting at least one piece of image data whose character information bears a predetermined or higher level of resemblance to the third search key.

9. A navigation system according to claim 1, wherein where a predetermined or higher number of image data is extracted through the search performed by using the first search key, the search-result output unit provides a plurality of narrowing-down conditions to the user for reducing the number of the extracted image data and outputs image data obtained by the reduction according to a predetermined condition selected by the user from among the narrowing-down conditions.

10. A navigation system according to claim 9, further comprising a condition sort unit for controlling information about use frequency of the narrowing-down conditions selected by the user and sorting the presentation order of the narrowing-down conditions in decreasing order of the use frequency.

11. A navigation method comprising:
    searching across an image database by using input image data, as a first search key, where the database stores image data obtained by imaging various areas and extracting at least one piece of image data bearing a predetermined or higher level of resemblance to the first search key;
    outputting the extracted image data; and
    determining position information stored and correlated with image data selected by a user from among the output image data to be a destination.

12. A navigation method according to claim 11, wherein image-data extraction includes:
    extracting a feature amount of the first search key; and
    extracting at least one piece of image data whose feature amount bears a predetermined or higher level of resemblance to the extracted feature amount by comparing the extracted feature amount against a feature amount of each of the image data stored in the image database.

13. A navigation method according to claim 11, wherein image-data extraction is achieved by performing search only for image data correlating with position information specified by travel history information of a vehicle according to an instruction transmitted from the user.

14. A navigation method according to claim 11, wherein image-data extraction is achieved by performing search only for data on at least one image imaged on the same date as a travel date obtained from travel history information of a vehicle, or a predetermined imaging date within a predetermined error range.

15. A navigation method according to claim 11, wherein the first search key is obtained and input via a removable recording medium to a main body of the navigation system.

16. A navigation method according to claim 11, wherein the first search key is obtained and input by segmenting a predetermined part of an image in predetermined timing, the image being received by a TV reception device provided in a vehicle.

17. A navigation method according to claim 11, further comprising extracting an outline of an object included in the first search key, whereby a predetermined area is segmented from the image data, wherein the image extraction is achieved by searching across the image database by using image data within the segmented area, as a second search key.

18. A navigation method according to claim 11, further comprising:
 determining whether or not the search is to be performed by using character information included in the first search key;
 recognizing character information included in the first search key, when determining to search by using the character information; and
 searching point determination information that is stored and correlated with the image data stored in the image database by using the recognized character information, as a third search key, thereby extracting at least one piece of image data whose character information bears a predetermined or higher level of resemblance to the third search key.

19. A navigation system according to claim 11, wherein when a predetermined or higher number of image data is extracted through the search performed by using the first search key, outputting the extracted image data is achieved by providing a plurality of narrowing-down conditions to the user for reducing the number of the extracted image data and outputting image data obtained by the reduction performed according to a predetermined condition selected by the user from among the narrowing-down conditions.

20. A navigation method according to claim 19, further comprising controlling information about use frequency of the narrowing-down conditions selected by the user, so as to sort the presentation order of the narrowing-down conditions in decreasing order of the use frequency.

* * * * *